US009592588B2

(12) United States Patent
Bender

(10) Patent No.: US 9,592,588 B2
(45) Date of Patent: Mar. 14, 2017

(54) PIPE ALIGNING TOOL

(71) Applicant: 1729655 Alberta Ltd., Edmonton (CA)

(72) Inventor: Quinn Bender, Edmonton (CA)

(73) Assignee: 1729655 ALBERTA LTD., Edmonton, Alberta (CA)

( * ) Notice: Subject to any disclaimer, the term of this patent is extended or adjusted under 35 U.S.C. 154(b) by 107 days.

(21) Appl. No.: 14/460,906

(22) Filed: Aug. 15, 2014

(65) Prior Publication Data

US 2015/0000091 A1    Jan. 1, 2015

Related U.S. Application Data

(63) Continuation-in-part of application No. 13/606,554, filed on Sep. 7, 2012, now Pat. No. 8,850,679.

(60) Provisional application No. 61/537,252, filed on Sep. 21, 2011.

(51) Int. Cl.
| | |
|---|---|
| *B25B 27/14* | (2006.01) |
| *B25B 5/14* | (2006.01) |
| *B25B 27/16* | (2006.01) |
| *F16L 23/00* | (2006.01) |

(52) U.S. Cl.
CPC .............. *B25B 5/147* (2013.01); *B25B 27/16* (2013.01); *F16L 23/003* (2013.01); *Y10T 29/53917* (2015.01)

(58) Field of Classification Search
USPC .......................................................... 29/272
See application file for complete search history.

(56) References Cited

U.S. PATENT DOCUMENTS

| | | | | | |
|---|---|---|---|---|---|
| 1,940,910 | A | * | 12/1933 | Hickey .............. | B23K 37/0536 269/130 |
| 3,199,721 | A | * | 8/1965 | Williams .............. | B25B 23/103 29/441.1 |
| 3,925,854 | A | * | 12/1975 | McFadden ......... | B23K 37/0533 219/161 |
| 3,944,202 | A | * | 3/1976 | Dearman ........... | B23K 37/0533 228/49.3 |
| 3,952,936 | A | * | 4/1976 | Dearman ................ | F16L 13/02 228/49.3 |
| 4,174,996 | A | * | 11/1979 | Hunter .................... | B29C 65/20 156/499 |
| 4,279,177 | A | * | 7/1981 | Yamashita ................ | F16H 3/72 475/215 |
| 4,356,615 | A | * | 11/1982 | Dearman ........... | B23K 37/0533 228/49.3 |

(Continued)

*Primary Examiner* — Alvin Grant
(74) *Attorney, Agent, or Firm* — Ryan W. Dupuis; Kyle R. Satterthwait; Ade & Company Inc.

(57) ABSTRACT

A pipe alignment tool for aligning abutted ends of first and second pipe sections to be joined includes a clamp member adapted to be clamped circumferentially about the first pipe section and one or more pipe engaging members mounted on the clamp member adapted to extend across a seam between the abutted ends of the first and second pipe sections to overlap the second pipe section. A bearing member is rotatably supported on each pipe engaging member for rolling contact with the second pipe section to assist in positioning the second pipe section relative to the first pipe section. The clamp member may be formed of modular sections connected circumferentially in series in which each modular section defines a mounting location upon which a pipe engaging member can be removably attached.

14 Claims, 8 Drawing Sheets

(56) References Cited

U.S. PATENT DOCUMENTS

| | | | | |
|---|---|---|---|---|
| 4,378,937 A * | 4/1983 | Dearman | ............ | B23K 37/0533 269/203 |
| 4,586,647 A * | 5/1986 | Dearman | .................. | F16L 3/20 228/49.3 |
| 4,726,575 A * | 2/1988 | Dearman | ............ | B23K 37/0533 269/131 |
| 4,895,055 A * | 1/1990 | Bisping | ................. | B25B 23/103 81/53.2 |
| 5,165,160 A * | 11/1992 | Poncelet | ............ | B23K 37/0533 228/49.3 |
| 5,560,091 A * | 10/1996 | Labit, Jr. | ................. | B25B 27/16 269/43 |
| 5,573,229 A * | 11/1996 | Lycan | ................ | B23K 37/0533 269/43 |
| 5,865,430 A * | 2/1999 | Conover | ............ | B23K 37/0533 228/49.3 |
| 6,161,296 A * | 12/2000 | Davio | ................ | B23K 37/0426 228/212 |
| 6,327,763 B2 * | 12/2001 | Stephen | ......................... | 269/43 |
| 6,641,124 B2 * | 11/2003 | Melanson | ........... | B23K 37/0533 228/49.3 |
| 6,651,967 B1 * | 11/2003 | Barber | ............... | B23K 37/0533 228/49.3 |
| 6,983,525 B2 * | 1/2006 | Moreno | ................. | B23Q 3/186 228/49.1 |
| 7,168,169 B2 * | 1/2007 | Moreno | ................. | B23D 51/16 173/114 |
| 8,266,776 B2 * | 9/2012 | Dwileski, Jr. | ...... | B23K 37/0533 228/212 |
| 8,850,679 B2 * | 10/2014 | Bender | ................... | B25B 5/147 269/43 |
| 8,985,565 B2 * | 3/2015 | Mann | .................... | F16L 23/003 269/40 |
| 2007/0256288 A1 * | 11/2007 | Vermaat | ............. | B23K 37/0531 29/464 |
| 2008/0263850 A1 * | 10/2008 | Dwileski | ............ | B23K 37/0533 29/464 |

* cited by examiner

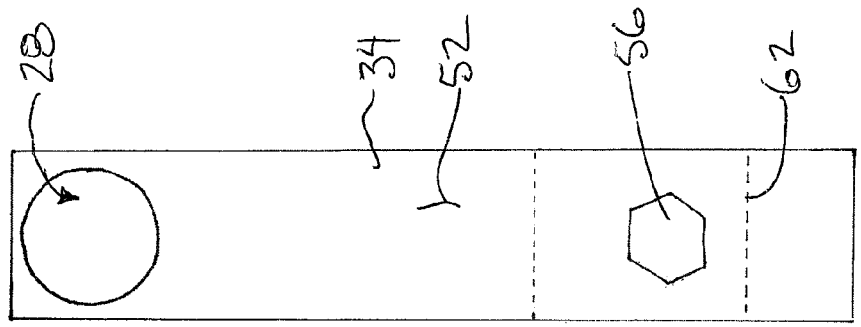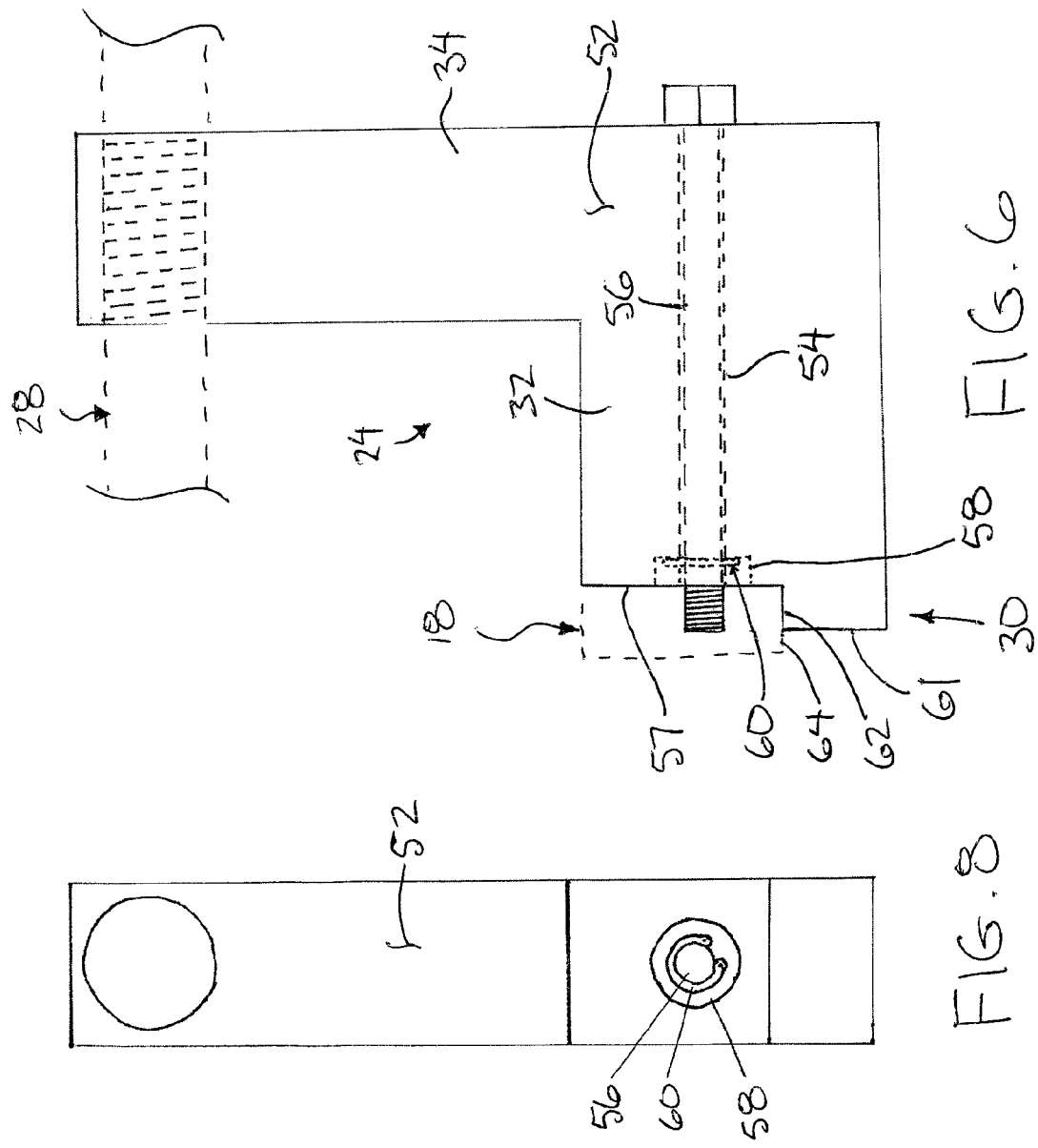

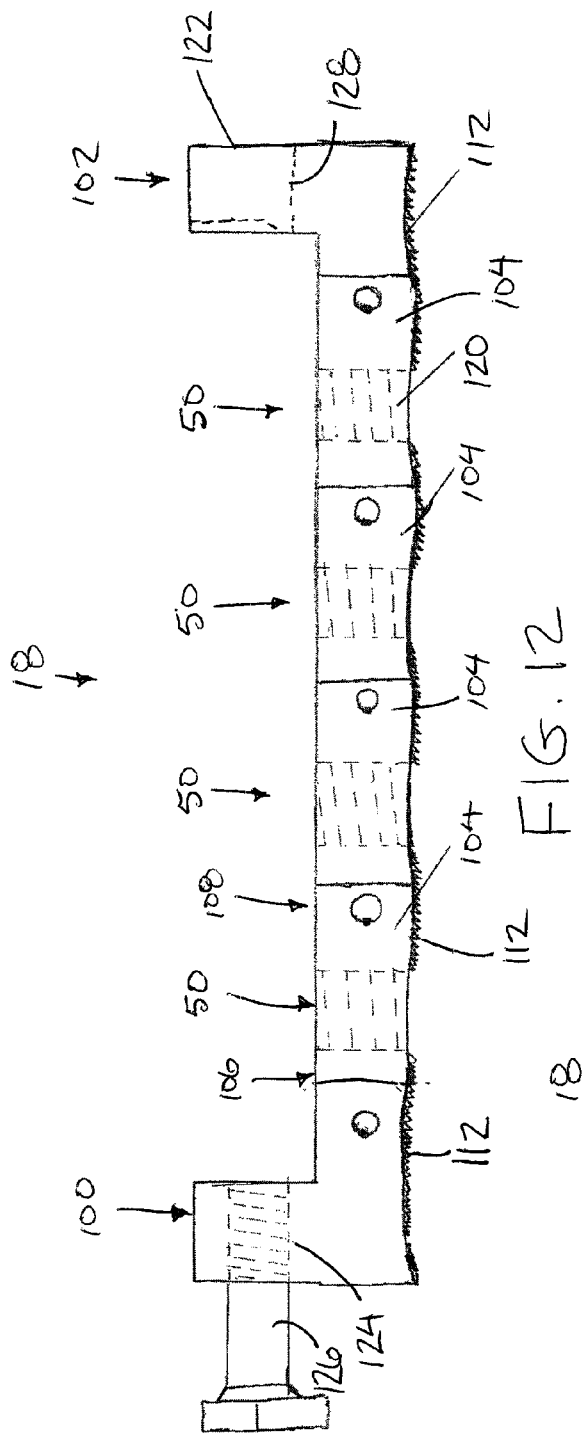
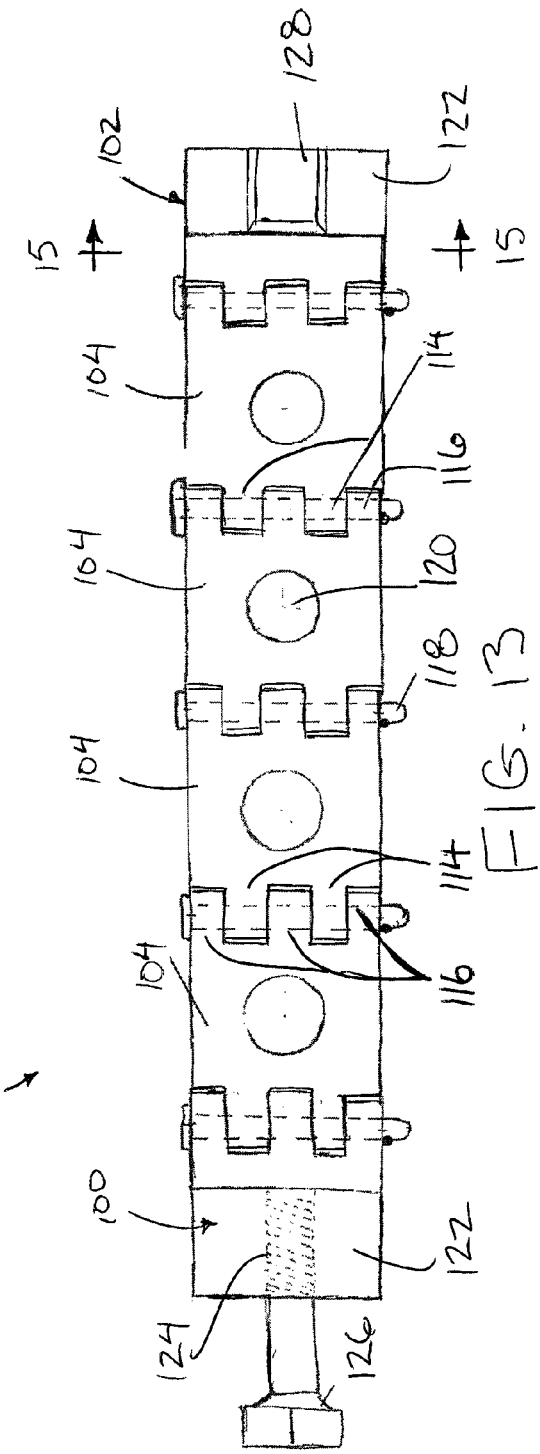

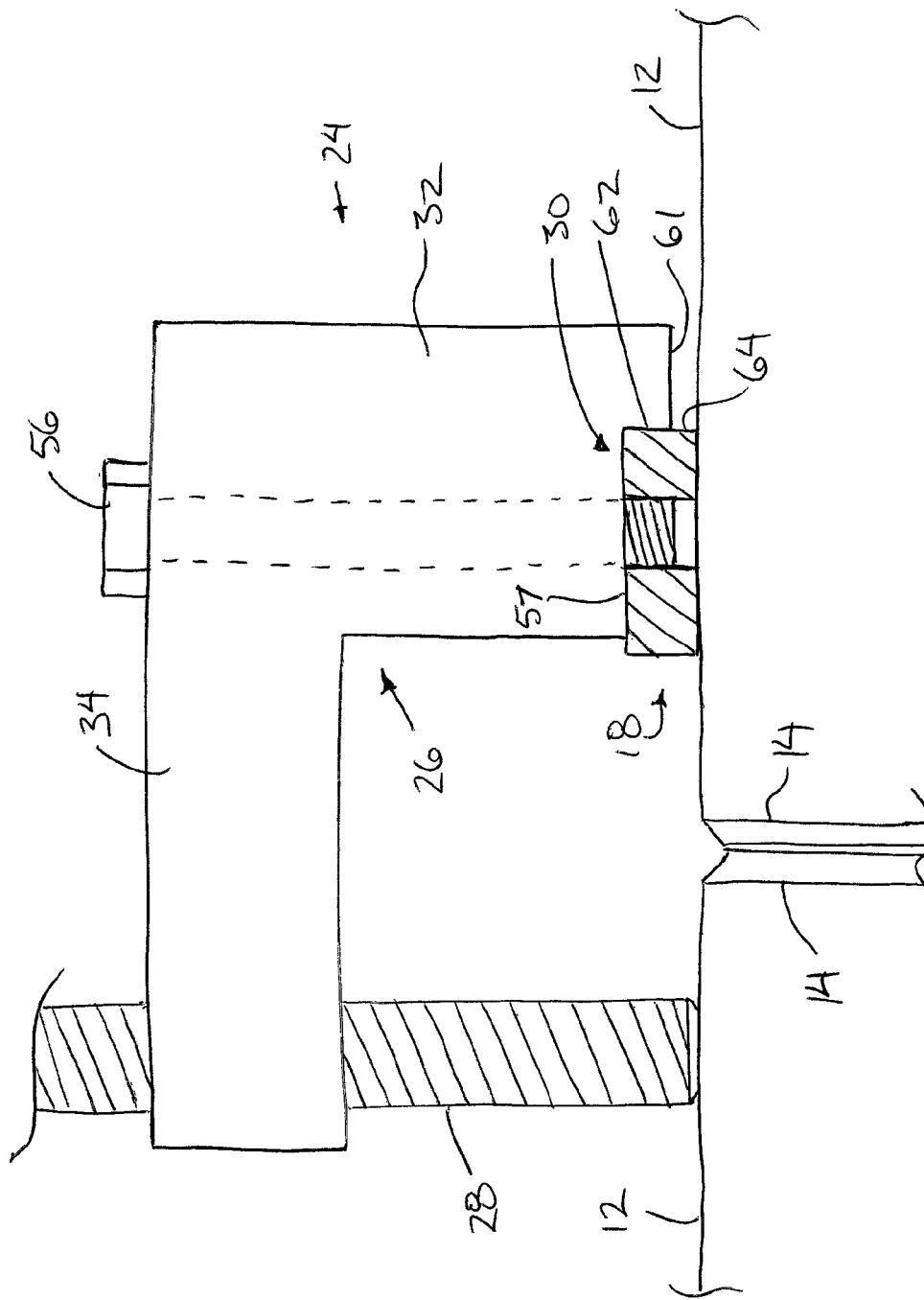

PIPE ALIGNING TOOL

This application is a continuation-in-part of U.S. Ser. No. 13/606,554 which claims the benefit under 35 U.S.C. 119(e) of U.S. provisional application Ser. No. 61/537,252, filed Sep. 21, 2011.

FIELD OF THE INVENTION

The present invention relates to a tool for aligning the ends of two abutted sections of pipe relative to one another, and more particularly the present invention relates to a pipe aligning tool including a clamp member for clamping about one pipe section and one or more pipe engaging members on the clamp member for engaging the other pipe section.

BACKGROUND

When connecting pipelines or distributed plumbing in buildings or the like, it is common to attach pipe sections in end to end abutment with the pipes in proper alignment with one another. To achieve this alignment, various tools have been proposed as disclosed for example in U.S. Pat. Nos. 4,726,575 and 3,952,936 both to Dearman, U.S. Pat. No. 6,651,967 by Barber, U.S. Pat. No. 5,560,091 by Labit Jr, and U.S. Pat. No. 6,641,124 by Melanson. Typical prior art devices involve clamping about one of the pipe sections with pipe engaging members extending from the clamp to engage the other pipe section.

In each instance of the prior art noted above, the pipe engaging members frictionally engage the second pipe, which may cause damage to the second pipe as the second pipe is displaced relative to the first pipe during pipe alignment. The friction may also make it difficult to align the second pipe by rotation or longitudinal displacement relative to the first pipe so that accurate alignment is somewhat resisted by the frictional forces.

Another problem with many prior art pipe aligning tools is the limited ability to customize the number and location of pipe engaging members. For example U.S. Pat. No. 6,641,124 by Melanson (noted above) discloses a pipe aligning device which uses a chain to clamp a plurality of pipe engaging members onto a first pipe section so that they are suitably positioned for engaging and supporting a second pipe section to be aligned with the first pipe section. Any repositioning of pipe engaging members or the addition of another pipe engaging member if it is later found to be required, necessitates releasing the chain so that all support of the second pipe section relative to the first pipe section is lost. Likewise, U.S. Pat. No. 4,726,575 by Dearman (also noted above) similarly uses a chain to clamp about the first pipe section, but the pipe engaging members further require the chain to be threaded therethrough such that any repositioning of pipe engaging members or the addition of another pipe engaging member also necessitates releasing the chain.

SUMMARY OF THE INVENTION

According to one aspect of the invention there is provided a pipe alignment tool for aligning abutted ends of first and second pipe sections to be joined, the tool comprising:

a clamp member extending about a longitudinal axis so as to be adapted to be clamped circumferentially about the first pipe section adjacent the end of the pipe; and at least one pipe engaging member mounted on the clamp member so as to extend longitudinally from a first end fixed to the clamp member to an opposing second end adapted to overlap the second pipe section such that the pipe engaging member extends across a seam between the abutted ends of the first and second pipe sections so as to be arranged to engage the second pipe section;

the clamp member including a plurality of designated mounting locations formed thereon at circumferentially spaced apart positions; and said at least one pipe engaging member being arranged to be selectively supported at any one of the designated mounting locations in abutment with an outer surface of the clamp member so as to be readily separable from and reattachable to the clamp member while the clamp member remains clamped circumferentially about the first pipe section.

By mounting the pipe engaging members in abutment with an outer surface of the clamp member, individual ones of the pipe engaging members can be detached for repositioning, or new pipe engaging members can be added where additional support is found to be required during a pipe alignment procedure, without loss of support by other ones of the pipe engaging members.

Preferably said at least one pipe engaging member is arranged to be supported in abutment with an outer surface of the clamp member.

Preferably the clamp member has an inner side arranged for abutment with the pipe engaging member in a clamped position about the first pipe section and the clamp member is arranged to support said at least one pipe engaging member thereon at a location which is radially outward relative to the inner side.

Preferably said at least one pipe engaging member is arranged to be secured to the clamp member using a threaded fastener.

In some embodiments, said at least one pipe engaging member includes a threaded fastener rotatably retained thereon which is arranged for threaded connection with the clamp member.

Preferably the designated mounting locations formed on the clamp member are evenly spaced apart.

In some embodiments, the clamp member includes an end face in which an inner end of said at least one pipe engaging member is stepped to define a first end surface in abutment with the outer surface of the clamp member, a second end surface offset radially from the first end surface, and a shoulder surface between the first and second end surfaces which is in abutment with the end face of the clamp member.

In some embodiments the clamp member has an inner side arranged for abutment with the pipe engaging member in a clamped position about the first pipe section and the clamp member includes a plurality of teeth protruding from the inner side so as to be arranged for biting engagement with the first pipe section.

In some embodiments the clamp member comprises a plurality of modular sections arranged to be connected in series in a circumferential direction about the first pipe section in which each modular section locates at least one of the designated mounting locations thereon.

According to another aspect of the present invention there is provided a pipe alignment tool for aligning abutted ends of first and second pipe sections to be joined, the tool comprising:

a clamp member comprising a plurality of modular sections arranged to be connected in series in a circumferential direction so as to be clamped circumferentially about the first pipe section;

at least some of the modular sections including respective designated mounting locations formed thereon such that designated mounting locations are arranged to be located at circumferentially spaced apart positions about the first pipe section; and at least one pipe engaging member mountable on the designated mounting location of one of the modular sections of the clamp member so as to extend longitudinally from a first end fixed to the clamp member to an opposing second end adapted to overlap the second pipe section such that the pipe engaging member extends across a seam between the abutted ends of the first and second pipe sections so as to engage the second pipe section.

The clamp member may further comprise two end sections between which the modular sections are arranged to be connected in series in which the two end section are connected by a clamping fastener extending therebetween in the circumferential direction of the first pipe section.

When the clamping fastener includes a threaded shaft and a head having a bevelled inner end supported on one end of the threaded shaft, the clamp member may be arranged such that one end section has a threaded bore which threadably receives the threaded shaft therein and another end section has a fastener slot receiving the threaded shaft therethrough in which the fastener slot has a mating bevelled surface at one end thereof which is arranged to mate with the bevelled inner end of the head of the clamping fastener so as to self-center the clamping fastener relative to the respective end section.

Each modular section may extend in the circumferential direction of the first pipe section between a first end including a plurality of teeth protruding from an inner side thereof so as to be arranged for biting engagement with the first pipe section, and a second end arranged to be pivotally coupled to the first end of an adjacent modular section.

Each modular section may have an inner side which is generally concave between the first and second ends.

The pipe engaging members are preferably arranged to be secured to the respective designated mounting location using threaded fasteners.

Various embodiments of the invention will now be described in conjunction with the accompanying drawings in which:

BRIEF DESCRIPTION OF THE DRAWINGS

FIG. 6 is a side elevational view of a second embodiment of one of the pipe engaging members;

FIG. 7 is an elevational view of the pipe engaging member according to the second embodiment of FIG. 6 as viewed radially outward from the longitudinal axis;

FIG. 8 is an elevational view of the pipe engaging member according to the second embodiment of FIG. 6 from the opposing direction relative to FIG. 7;

FIG. 12 is end elevational view of a further embodiment of the clamp member shown separated from the pipe sections;

FIG. 13 is a top plan view of the clamp member according to the embodiment of FIG. 12;

FIG. 16 is a side elevational view of the clamp member according to the embodiment of FIG. 12, shown clamped about the first pipe section with one of the pipe engaging members according to FIGS. 6 through 10 shown mounted thereon in engagement with the second pipe section.

In the drawings like characters of reference indicate corresponding parts in the different figures.

DETAILED DESCRIPTION

Figure 1:
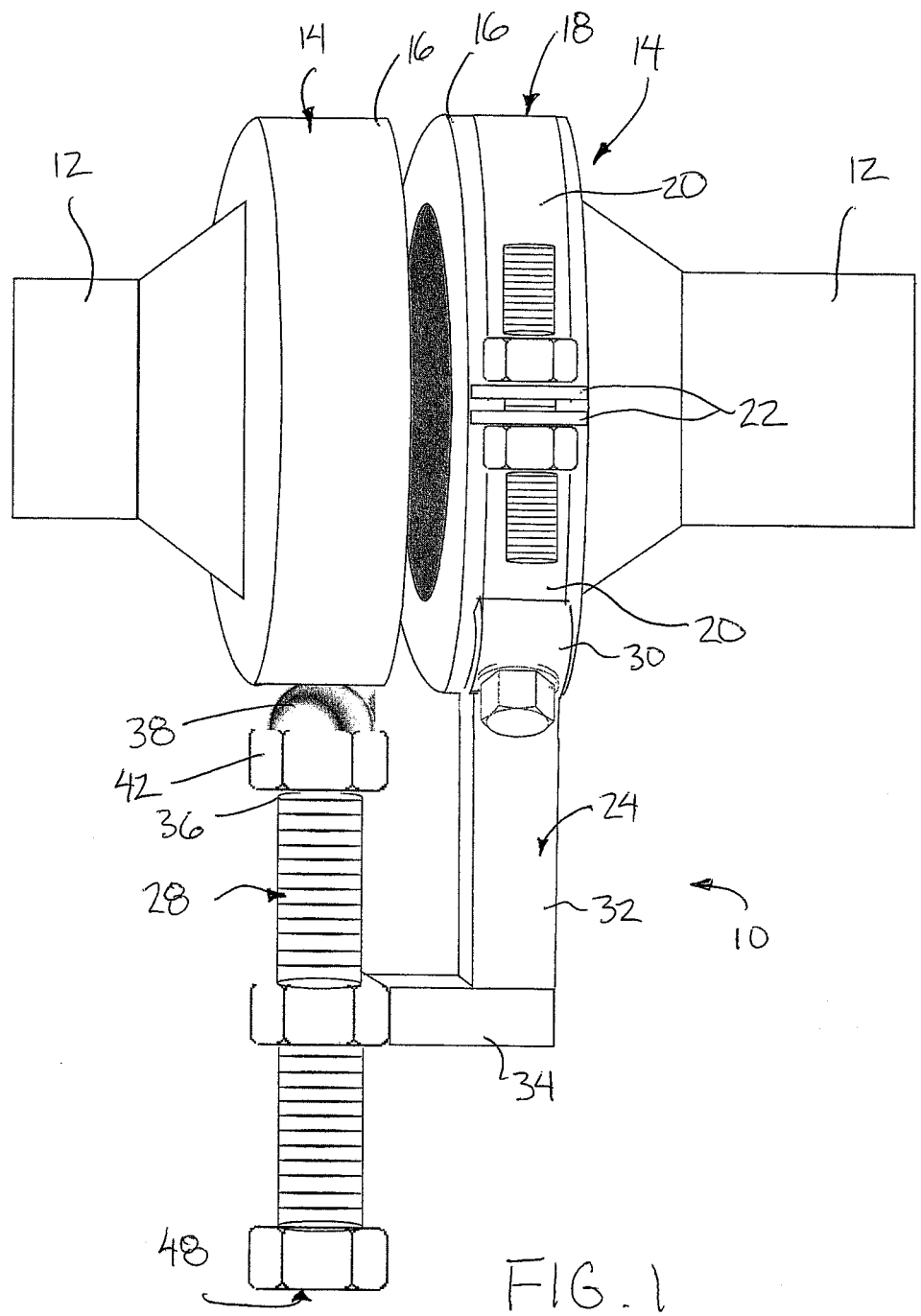
FIG. 1 is a perspective view of the pipe alignment tool according to a first embodiment.

Referring to the accompanying figures, there is illustrated a pipe alignment tool generally indicated by reference numeral 10. The tool 10 is suited for joining two pipe sections 12 such that the ends 14 are abutted in alignment with one another forming a seam between the abutted ends where the pipe sections. The pipe sections may be joined either by welding or by bolting together flanges 16 at the ends of the pipe as shown in the illustrated embodiment.

Although several embodiments are illustrated in the accompanying Figures, the common features of the various embodiments will first be described herein. In each instance, the tool 10 is particularly suited for clamping onto a first pipe section 12 adjacent the end thereof, for example about the end flange 16 while engaging the second pipe similarly at the end flange 16 to support and align the second pipe relative to the first pipe. The tool engages the second pipe adjacent the end of the pipe. The tool comprises a clamp member 18 which clamps onto the first pipe section.

In the illustrated embodiments, one pipe engaging member 24 is mounted on the clamp member 18 so as to be positioned adjacent the bottom of the pipe in use so that the second pipe section can rest on the pipe engaging member to carry the weight of the second pipe section on the first pipe section during relative alignment. Typically a plurality of pipe engaging members 24 are mounted at evenly circumferentially spaced positions about the longitudinal axis of the clamp member so that the pipe engaging members 24 collectively center the second pipe coaxially with the first pipe. More particularly, a set of four pipe engaging members at evenly spaced positions in the longitudinal direction is particularly advantageous for optimally supporting the two pipe sections relative to one another.

Each pipe engaging member 24 comprises a first portion 26 fixed to the clamp member and a second portion 28 which is adjustably coupled to the first portion and adapted to engage the second pipe in rolling contact therewith.

The first portion 26 includes a base portion 30 secured to a respective portion 20 of the clamp member in fixed relation either by welding or by securing the base portion with bolts to studs welded on the clamp member. A leg 32 extends radially outward from the base portion in relation to the longitudinal axis of the clamp member. An arm 34 of the first portion is fixed to the leg 32 and extends axially in the longitudinal direction from a first end fixed to the leg at a location spaced radially outward from the base portion to an opposing second end adapted to overlap the second pipe by spanning across the seam between the abutted pipe sections.

The second portion 28 is connected to the second end of the arm 34 of the first portion so as to extend radially inward towards an inner end 36 for engaging the second pipe. The second portion generally comprises an elongate threaded rod which is threadably received through a threaded aperture or nut formed at the second end at the arm of the first portion. Accordingly rotating the rod about a respective radial axis of the clamp causes the second portion to be radially displaced and adjusted in radial position relative to the clamp member and the pipe section upon which it is secured.

Figure 2:
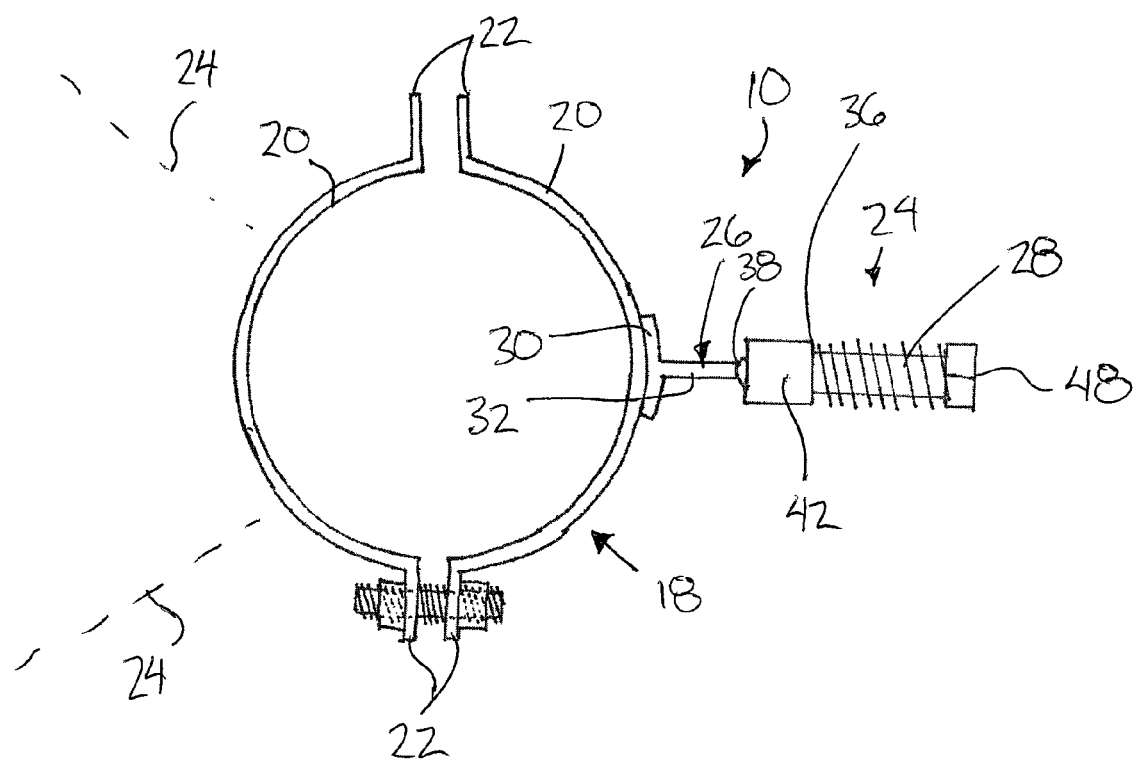
FIG. 2 is an end elevational view of the pipe alignment tool according to the first embodiment of FIG. 1.
Figure 3:
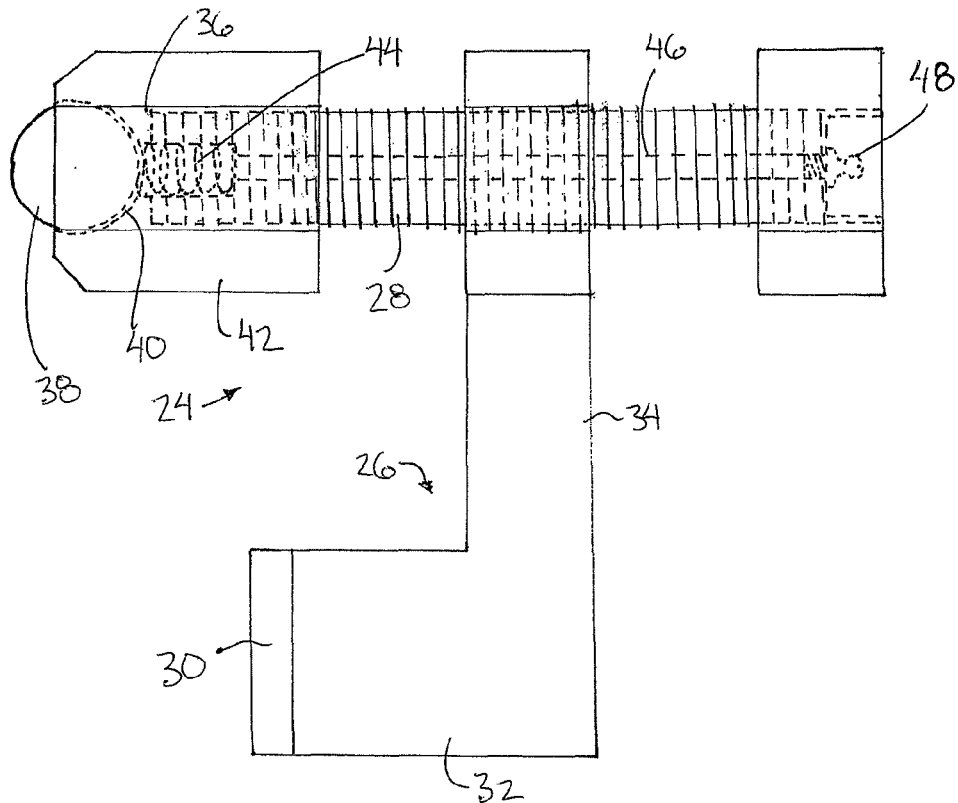
FIG. 3 is a side elevational view of one of the pipe engaging members according to the first embodiment of FIG. 1.
Figure 5:
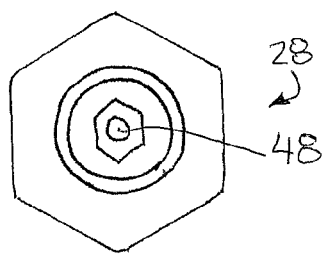
FIG. 5 is an elevational view of a portion of the pipe engaging member according to the first embodiment of FIG. 1 from the opposing direction relative to FIG. 4.
Figure 4:
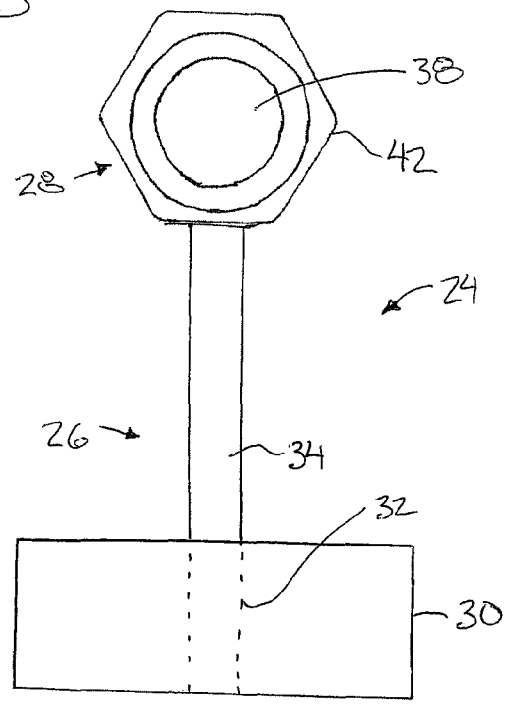
FIG. 4 is an elevational view of the pipe engaging member according to the first embodiment of FIG. 1 as viewed radially outward from the longitudinal axis.
Figure 9:
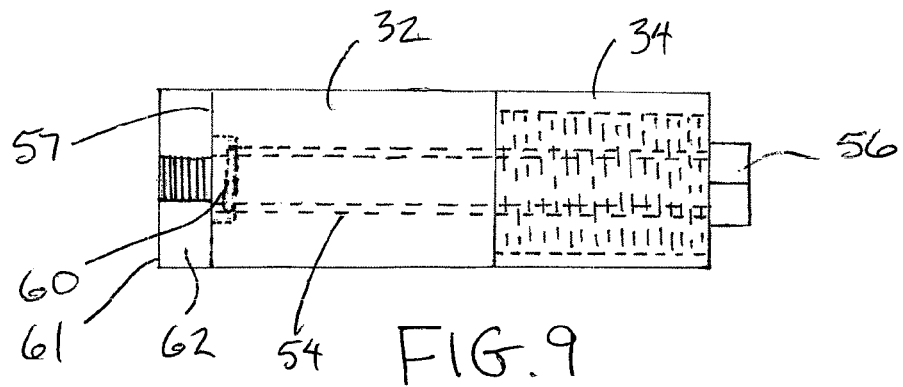
FIG. 9 is a first end elevational view of the pipe engaging member according to the second embodiment of FIG. 6.
Figure 10:
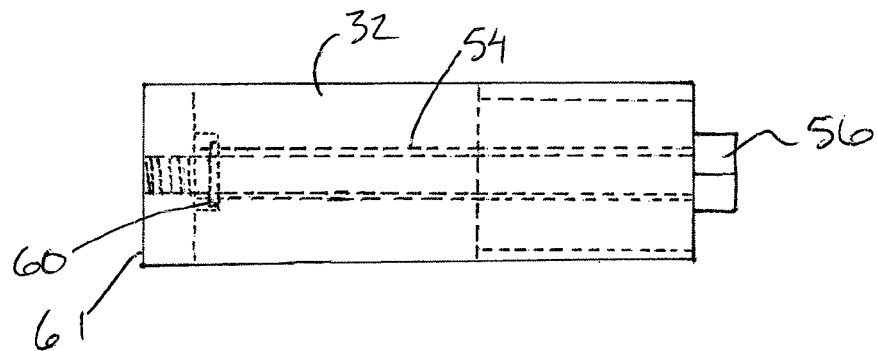
FIG. 10 is a second end elevational view of the pipe engaging member according to the second embodiment of FIG. 6.
Figure 11:
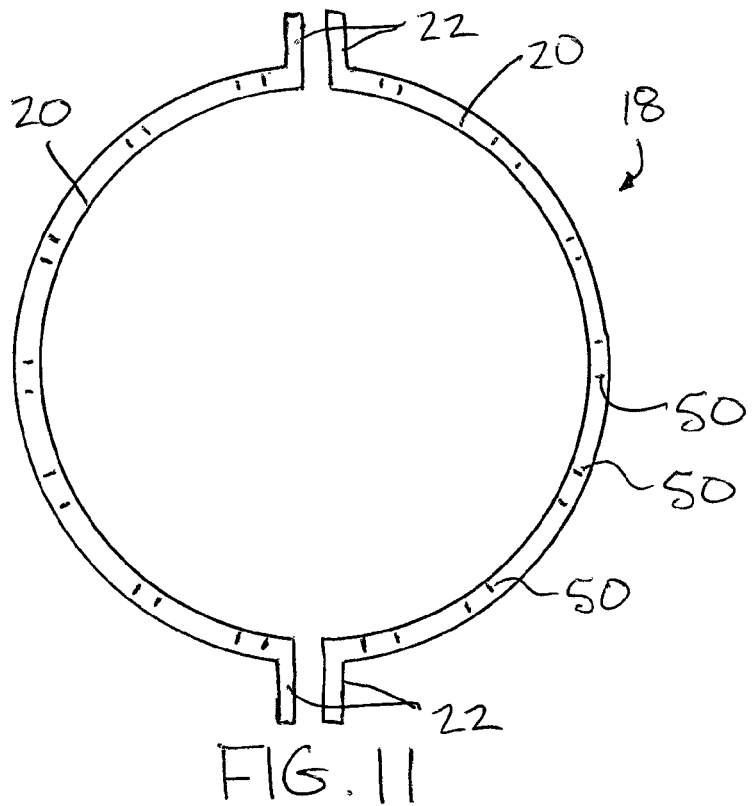
FIG. 11 is a schematic representation of the clamp member according to the second embodiment of FIG. 6.

In some instances the second portion 28 comprises a threaded rod with a blunt end for contacting the second pipe section. Alternatively, as shown in FIGS. 1 through 11, a rolling contact at the inner end 36 of the second portion 28 is used such that the second pipe is rotatably adjustable about its longitudinal axis as well as being readily moveable in an axial or longitudinal direction. In this instance, a bearing member 38 is mounted at the inner end of the second portion in the form of a freely rolling ball received within a socket 40 formed in the inner end of the second portion of the pipe engaging member. A cap member 42 is threaded onto the inner end of the second portion overtop of the ball defining the bearing member 38 so as to retain the bearing member within the socket. A central opening in the cap 42 allows the bearing member to protrude outwardly beyond the cap for rolling contact with the second pipe with which it engages.

The bearing is supported for free rotation in the any direction including rolling movement about an axis parallel to the longitudinal axis when rotating the second pipe about its longitudinal axis as well as rolling movement about an axis perpendicular to the longitudinal direction when axially displacing the second pipe towards and away from the first pipe.

The socket 40 is suitably sized to allow some radial displacement of the bearing member within the socket relative to the first and second portions of the pipe engaging member. A spring 44 is mounted within the socket between the bearing member and the internal end of the socket so as to urge the bearing member in the radial direction relative to the second portion 28 towards the central longitudinal axis about which the clamp is aligned.

A grease port 46 is formed to extend in a radial direction through the second portion 28 of the pipe engaging member for communication at an inner end with the bearing member in the socket 40 and for communication at an outer end with a nipple 48 formed on the outer end of the second portion. The nipple includes an injection port therethrough permitting attachment of a suitable grease gun or the like to inject grease through the grease port to maintain the bearing member well lubricated relative to the socket.

Also as shown in the embodiments of FIGS. 1 through 11, the first embodiment of the clamp member 18 is a generally annular member which encircles a longitudinal axis so as to be adapted to be clamped circumferentially about the first pipe section in which the longitudinal axis of the clamp is aligned with the longitudinal direction of the pipe section. More particularly, according to FIGS. 1 through 11, the clamp member 18 comprises two semi-circular portions 20, each extending near 180 degrees about the circumference of the pipe section. Opposing ends of each portion 20 include bolt flanges 22 projecting radially outward from the longitudinal axis with bolt apertures formed therein such that the bolt flanges of one portion 20 can be bolted to the corresponding flanges of the other portion to fully encircle the pipe section and clamp the pipe section therebetween. Due to the two portions each spanning less than 180 degrees, a gap remains between the opposing ends of the two portions so that tightening the bolts joining the bolt flanges causes the clamp member 18 to be clamped and frictionally retained relative to the pipe.

Figure 15:
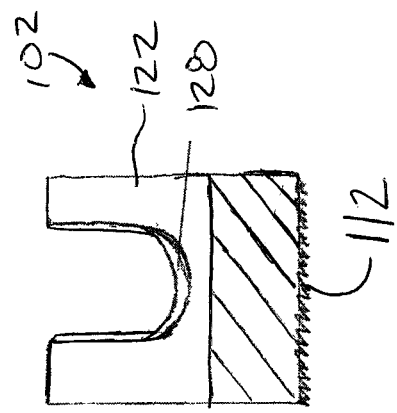
FIG. 15 is a section view along the line 15-15 in FIG. 13 of a portion of one of the end sections of the clamp member.
Figure 14:
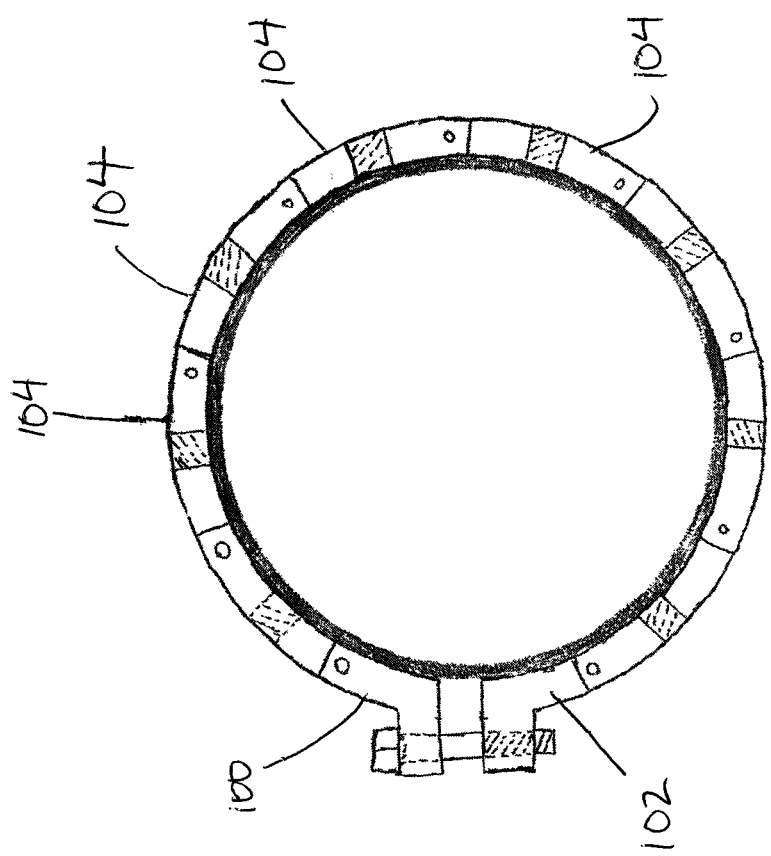
FIG. 14 is an end elevational view of the clamp member according to the embodiment of FIG. 12, shown clamped about the first pipe section.

A second embodiment of the clamp member 18 is described below in relation to the embodiment of FIGS. 12 through 16.

Turning now more particularly to the embodiment of FIGS. 1 through 4, the pipe engaging member in this instance is arranged such that the base portion 30 of each pipe engaging member comprises a flange which extends in the circumferential direction for overlapping an outer surface of a portion of the clamp member. The flange is joined by welding or by various fastening techniques to the clamp member at a selected mounting location. The leg 32 and the arm 34 are integrally joined in fixed and seamless connection with the flange forming the base portion 30.

Turning now to both the embodiments of FIGS. 6 through 11 and FIGS. 12 through 16, the pipe engaging member instead mounts at designated mounting locations 50 formed at circumferentially spaced apart positions on the clamp member 18. Each pipe engaging member is arranged to be selectively supported at any one of the designated mounting locations so as to be readily separable from the clamp member. The designated mounting locations 50 comprise respective threaded bores formed in the body of the clamp member about respective radially oriented axis at evenly spaced apart positions, for example at 1.5 inch intervals in the circumferential direction.

Position of each pipe engaging members is thus readily adjustable in the circumferential direction. This is desirable for example to position the pipe engaging members out of the way of obstructions that would prevent stud and bearing from contacting the other surface. Another advantage to adjustable placement of the pipe engaging members is when a gasket needs to be installed between the flanges. Because of the circular gasket design for flanges, there is a certain amount of spacing required in order for the gasket to fit between the studs and bearings. More typically a user would place four pipe engaging members equally spaced around the collar of the clamping member to maximize the alignment of the circular surfaces relative to one another.

Each pipe engaging member in this instance includes a main body 52 defining the leg 32 and the arm 34 noted above. A bore 54 extends fully through the main body in a radial direction relative to the clamp member and pipe sections in alignment with the leg 32 to receive a threaded bolt 56 extending fully therethrough. A head of the bolt 56 is arranged to abut an outer side of the body 52 while the opposing threaded end of the bolt 56 protrudes radially inwardly beyond an engaging surface 57 about the bore the inner side of the body 52 which abuts the corresponding outer surface of the clamp member in a mounted position. As shown in the accompanying figures, each pipe engaging member 24 abuts an outer surface of the clamp member 18 so as to permit removal from the clamp member and reattachment to the clamp member at a different mounting location 50 while the clamp member 18 remains secured about a respective pipe section 12. As further shown in the Figures, the clamp member has an inner side arranged for abutment with the pipe engaging member in a clamped position about the first pipe section in which the clamp member is arranged to support said at least one pipe engaging member thereon at a location which is radially outward relative to the inner side.

The threaded end of the bolt is thus arranged to be received in threaded connection into a selected one of the threaded bores in the clamp member when the body is abutted with the outer side of the clamping member. The bolt has a suitable length such that the threaded end protrudes from the body by a radial distance which is less than a radial thickness of the body of the clamping member, which may be ⅝ of an inch for example, such that the bolts do not engage through the clamp member into the pipe sections.

The bore 54 receiving the bolt 56 therein is sufficient oversized relative to the bolt that the bolt is freely rotatable within the bore. The inner end of the bore includes a recessed counter bore 58 of increased diameter to accommodate a snap ring 60 in a corresponding groove about the bolt. The groove in the bolt is located relative to the bolt head so as to be received within the counter bore 58 when the bolt head is abutted with the outer side of the body. The snap ring 60 serves to retain the bolt rotatable within the bore 54 by abutment with an inner end face of the counter bore 58 even when the bolt is threadably released from a corresponding bore in the clamp member such that the bolt remains readily accessible for reattachment to the clamp member at a different mounting location.

The inner end of the leg portion 32 of the body is stepped to define the engaging surface 57 which is recessed radially into the body relative to a remaining end face 61. The resulting shoulder 62 defined between the engaging surface 57 abutting the outer side of the clamp member and the remaining end face 61 is located relative to the bolt and threaded bore such that the shoulder abuts a corresponding end face 64 of the clamp member when the bolt and threaded bore are aligned.

In an alternative embodiment of the present invention, the second portion 28 of the pipe engaging member comprises a hydraulic piston cylinder assembly in which the cylinder is anchored onto the first portion 26 and the piston is extendable relative to the cylinder to extend radially inward towards the central longitudinal axis. The bearing member 38 in this instance is supported within a respective socket 40 in the inner end of the piston. Hydraulic pressure can be used to urge the bearing member inwardly into engagement with the pipe section in this instance such that a spring member 44 may not be required within the socket.

Turning now to FIGS. 12 through 18, a further embodiment of the clamp member 18 is illustrated. In this instance, the body of the clamp member comprises a plurality of sections connected in series with one another in the circumferential direction of clamping about the end of the first pipe section. The sections include a first end section 100, a second end section 102 and a plurality of intermediate modular sections 104 connected in series between the opposing first and second end sections.

Each intermediate modular section 104 is pivotally coupled to adjacent sections about respective pivot axes which are all parallel to one another and the axial direction of the pipe sections about which the clamp member is clamped. Each intermediate section 104 has a body which extends generally in the circumferential direction of the pipe section between a first end 106 and a second end 108 thereof. An inner side 110 of the body is generally concave between the first and second ends so as not to interfere with engagement of the first and second ends with the outer periphery of the pipe through a large range of pipe diameters.

A plurality of teeth 112 protrude inwardly from the inner side of each section, particularly at the first end thereof for biting engagement with the outer periphery of the pipe section upon which it is engaged in use. The opposing second end may further include teeth at the inner side thereof, or alternatively the second end may be arranged for biting engagement solely by the teeth at the first end of an adjacent section of the clamp member coupled thereto.

At the first end of each intermediate modular section 104, there is provided a first set of knuckles 114 protruding from the end of the main body in the circumferential direction about the pipe section. Each first knuckle 114 includes a pivot aperture extending therethrough such that the pivot apertures are all aligned with one another to define the pivot axis of relative pivotal movement between that modular section and an adjacent modular section of the clamp member.

At the opposing second end, the body of each intermediate modular section 104 further includes a plurality of second knuckles 116 which protrude in the circumferential direction of the pipe section beyond the end of the main body for mating reception between adjacent first knuckles 114 of an adjacent section of like configuration. The second knuckles similarly include pivot apertures therein which align with the pivot apertures in the first knuckles to receive a common pivot pin 118 slidably therethrough which retains the first and second knuckles coupled to one another between two adjacent intermediate modular sections. The pivot pin 118 includes a head at one end and a spring loaded retainer ball at the opposing end to retain the pivot pin essentially within the corresponding pivot apertures of the two adjacent modular sections which it couples together.

All of the intermediate modular sections are identical to one another so as to be readily interchangeable with one another and so as to permit more sections or fewer sections to be connected in series between the first and second end sections according to the pipe diameter about which the clamp member is to be secured. The axial width of each second knuckle closely fits between adjacent first knuckles and the axial width of the first knuckles closely fit between second knuckles to limit relative movement to a pivotal movement about the pivot pins. In the illustrated embodiment two first knuckles are provided at the first end of each section and three second knuckles are provided at the second end thereof.

The designated mounting locations 50 comprise a single threaded bore 120 centrally located in the main body of each intermediate modular section so as to be centered both in the widthwise direction corresponding to the axial direction of the pipe section and in the lengthwise or circumferential orientation relative to the pipe section. The bore 120 extends fully through the main body of the modular section between the inner side and an opposing outer side against which a respective one of the pipe engaging members 24 is abutted in a mounted position thereon. Mounting of the pipe engagement member 24 is substantially identical to the mounting thereof on the clamp member according to the embodiment of FIGS. 6 through 11.

The first end section 100 has an inner side which is also concave and locates teeth 112 protruding inwardly from the inner side thereof for biting engagement with the outer periphery of the pipe section. A set of second knuckles protrude from the inner end thereof for mating connection with the first knuckles of an adjacent intermediate modular section for relative pivotal movement therebetween. At the opposing end, the first end section includes an upright flange 122 which is oriented to extend generally radially relative to the pipe section and perpendicularly to the circumferential direction in a mounted position about the pipe section. A threaded bore 124 extends fully through the upright flange of the first end section for threaded connection to the threaded shaft of a clamp fastener 126 as described further below.

The second end section 120 is similarly arranged to include a set of first knuckles 114 at the inner end thereof for mating connection with the second knuckles of an adjacent intermediate modular section. The inner side of the second end section also includes teeth 112 thereon which protrude inwardly for biting engagement with the outer periphery of the pipe section. An upright flange 122 is mounted at the opposing end of the second end section to be similarly oriented radially and perpendicularly to the circumferential direction of a pipe section about which the clamp member is secured. The upright flange of the second end section includes a fastener slot 128 formed therein which extends radially outward to be open at the outermost end of the flange. The flange is thus substantially U-shaped about the fastener slot 128. An inner edge about the fastener slot is beveled.

The clamp fastener 126 includes a threaded shaft with a head at one end thereof in which the inner end of the head is similarly beveled to mate with the bevel of the fastener slot 128. The beveled surfaces effectively self-center the clamp fastener 126 relative to the fastener slot 128.

In use, the clamp member is assembled by using a selected number of intermediate modular sections 104 coupled between the first and second end sections so that the overall length corresponds approximately to the circumference of the first pipe section upon which the clamp member is to be secured. The clamp fastener 126 threaded into the bore of the first end section is then aligned and received into the fastener slot of the second end section so that tightening of the clamp fastener into the threaded bore pulls the two upright flanges 122 towards one another to reduce the overall circumference of the clamp member for overall clamping engagement about the first pipe section.

One or more pipe engaging members are then threadably connected to the designated mounted locations 50 of one or more intermediate modular sections to provide support to a second pipe section supported thereon similarly to the use of the first embodiment of the tool.

As shown in FIG. 16, the second portion 28 of the pipe engaging member comprises conventional bolt or threaded rod having a beveled free end for engagement with the outer periphery of the second pipe section as opposed to the rolling contact of the bearing member 38 described above with regard to previous embodiments; however a rolling contact as described above may also be used with the embodiment of FIGS. 12 to 16 if desired. The threaded bores defining the designated mounting locations 50 are externally accessible to permit pipe engaging members to be readily separated and reattached to different ones of the intermediate modular sections as desired. Pipe engaging members can thus be placed where additional support and alignment between the two pipe sections to be joined is desired.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pipe alignment tool for aligning abutted ends of first and second pipe sections to be joined, the tool comprising:

a clamp member extending about a longitudinal axis so as to be adapted to be clamped circumferentially about the first pipe section adjacent the end of the pipe such that an inner side of the clamp member engages the first pipe section; and at least one pipe engaging member mounted on the clamp member so as to extend longitudinally from a first end fixed to the clamp member to an opposing second end adapted to overlap the second pipe section such that the pipe engaging member extends across a seam between the abutted ends of the first and second pipe sections so as to be arranged to engage the second pipe section;

the clamp member including a plurality of designated mounting locations formed thereon at circumferentially spaced apart positions; and said at least one pipe engaging member being supported at a selected one of the designated mounting locations so as to be readily separable from and reattachable to the clamp member; and each designated mounting location being externally accessible on the clamp member such that said at least one pipe engaging member can be separated from the selected designated mounting location and reattached to the selected designated mounting location while the clamp member remains clamped circumferentially about the first pipe section and the inner side of the clamp member remains in clamping engagement with the first pipe section.

2. The tool according to claim 1 wherein said at least one pipe engaging member is arranged to be supported in abutment with an outer surface of the clamp member.

3. The tool according to claim 1 wherein each designated mounting location is spaced radially outward relative to the inner side of the clamp member such that the clamp member is arranged to support said at least one pipe engaging member thereon at a location which is radially outward relative to the inner side.

4. The tool according to claim 1 wherein each designated mounting location comprises a threaded connector at a fixed location on the clamp member such that said at least one pipe engaging member is arranged to be secured to the clamp member using a threaded connection.

5. The tool according to claim 1 wherein said at least one pipe engaging member includes a threaded fastener rotatably retained thereon which is arranged for threaded connection with the selected designated mounting location.

6. The tool according to claim 1 wherein the designated mounting locations formed on the clamp member are evenly spaced apart at fixed locations on the clamp member.

7. The tool according to claim 1 wherein the clamp member includes an end face and wherein an inner end of said at least one pipe engaging member is stepped to define a first end surface in abutment with the outer surface of the clamp member, a second end surface offset radially from the first end surface, and a shoulder surface between the first and second end surfaces which is in abutment with the end face of the clamp member.

8. The tool according to claim 1 wherein the clamp member has an inner side arranged for abutment with the pipe engaging member in a clamped position about the first pipe section and wherein the clamp member includes a plurality of teeth protruding from the inner side so as to be arranged for biting engagement with the first pipe section.

9. The tool according to claim 1 wherein the clamp member comprises a plurality of modular sections arranged to be connected in series in a circumferential direction about the first pipe section, each modular section locating at least one of the designated mounting locations in the form of a threaded connector at a fixed location thereon.

10. The tool according to claim 9 wherein the clamp member further comprises two end sections between which the modular sections are arranged to be connected in series, the two end sections being connected by a clamping fastener extending therebetween in the circumferential direction of the first pipe section.

11. The tool according to claim 10 wherein:
the clamping fastener includes a threaded shaft and a head having a bevelled inner end supported on one end of the threaded shaft;
one end section has a threaded bore which threadably receives the threaded shaft therein;
another end section has a fastener slot receiving the threaded shaft therethrough; and
the fastener slot having a mating bevelled surface at one end thereof which is arranged to mate with the bevelled inner end of the head of the clamping fastener so as to self-center the clamping fastener relative to the respective end section.

12. The tool according to claim 9 wherein each modular section extends in the circumferential direction of the first pipe section between a first end including a plurality of teeth protruding from the inner side of the clamp member so as to be arranged for biting engagement with the first pipe section, and a second end arranged to be pivotally coupled to the first end of an adjacent modular section.

13. The tool according to claim 9 wherein each modular section extends in the circumferential direction of the first pipe section between a first end and a second end, and each modular section is generally concave at the inner side of the clamp member between the first and second ends.

14. The tool according to claim 1 wherein the clamp member comprises two semi-circular portions arranged to be damped to one another to fully encircle the first pipe section, each semi-circular portion locating a plurality of designated mounting locations thereon in which each designated mounting location comprises a threaded connector at a fixed location on the semi-circular portion.

\* \* \* \* \*